(No Model.)

T. DAVEY.
SPLIT PULLEY.

No. 416,575. Patented Dec. 3, 1889.

WITNESSES:
Patrick P. Sherry
Jas. Sherry

INVENTOR:
Thomas Davey

United States Patent Office.

THOMAS DAVEY, OF LYNN, MASSACHUSETTS, ASSIGNOR OF ONE-HALF TO PATRICK P. SHERRY, OF SAME PLACE.

SPLIT PULLEY.

SPECIFICATION forming part of Letters Patent No. 416,575, dated December 3, 1889.

Application filed July 13, 1889. Serial No. 317,409. (No model.)

*To all whom it may concern:*

Be it known that I, THOMAS DAVEY, of Lynn, in the county of Essex and State of Massachusetts, have invented certain new and useful Improvements in Split or Divided Pulleys, of which the following is a specification.

This invention pertains to certain new and useful improvements in split or divided rim-pulleys, having for its object the provision of new and improved highly-efficient means for readily and easily uniting the halves or sections of a pulley and rigidly securing the same to a shaft; and it comprises the detailed construction, combination, and arrangement of parts substantially as hereinafter fully set forth, and particularly pointed out in the claim.

Reference is to be had to the accompanying drawings, and to the letters of reference marked thereon, forming a part of this specification, the same letters designating the same parts or features wherever they occur.

Figure 4:
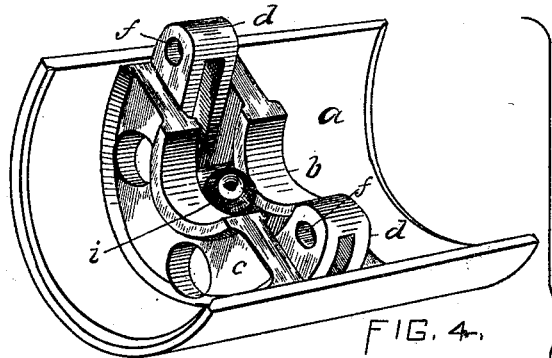
Figure 3:
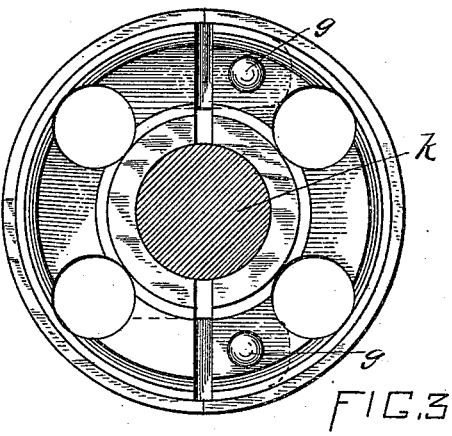
Figure 2:
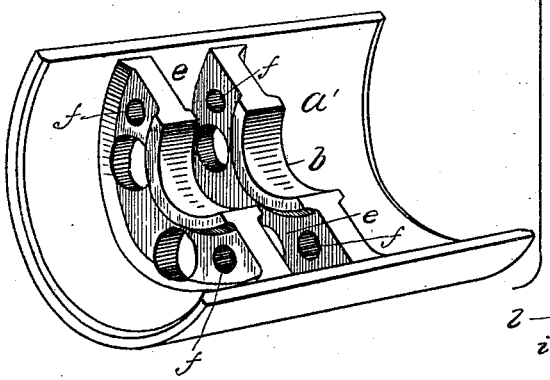
Figure 2:
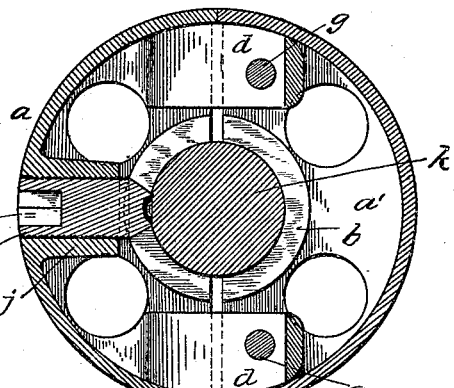
Figure 1:
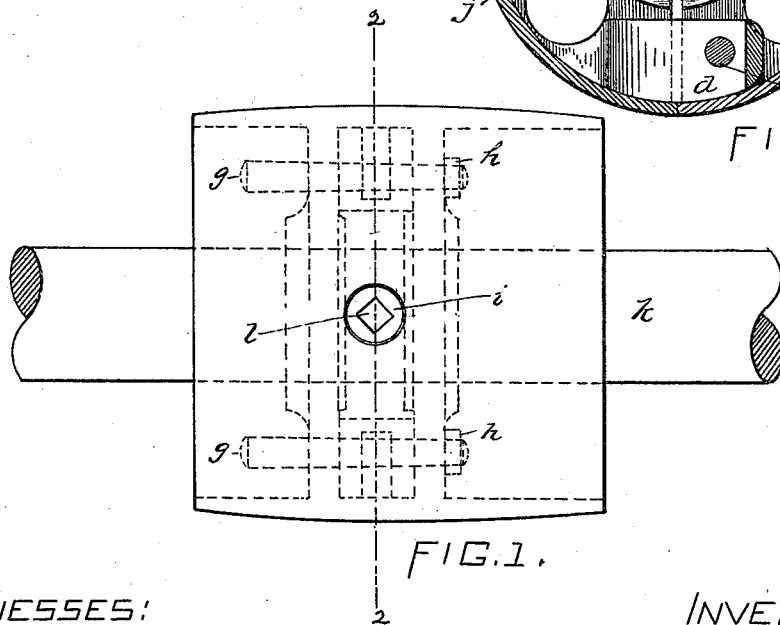

In the drawings, Figure 1 is a side elevation of a pulley embodying my invention. Fig. 2 is a vertical central section of Fig. 1, taken on the line 2 2. Fig. 3 is an end view. Fig. 4 shows perspective views of the two halves of my improved pulley.

In exemplification of my invention I have selected for illustration a pulley of small diameter and having a broad rim, since it is with pulleys of this kind that the greatest difficulty is experienced in securing the two parts together.

In the drawings, $a$ $a'$ designate the two halves of a split pulley, $b$ the hub portion, and $c$ the parallel web portions connecting the hub portion with the rim and subserving the purpose of arms or spokes employed in pulleys of larger diameter. The web $c$ of the half $a$ is provided with lugs or flanges $d$, extending at right angles to the axis of the pulley, and adapted to enter recesses $e$, formed by the parallel webs $c$ of the part $a'$, holes $f$ being formed through the flanges $d$ of the half $a$ and adjacent portions of the parallel webs of the other half $a'$ for the reception of pins or bolts $g$, which may be made tapering and driven into the holes $f$, so as to extend on a line parallel with the axis of the pulley and be provided or not on their entering ends with nuts $h$, as shown in Fig. 1. In most instances the pins or bolts $g$ may be held in place by friction.

$i$ designates a set-screw tapped into the rim in such position as to extend radially from the axis of the pulley, adapting it to be turned down upon the shaft $k$ to key the pulley thereto, and for this latter purpose the set-screw $i$ is provided in its outer end with a polygonal socket $l$ for the reception of the squared or polygonal end of a crank or wrench for the operation of the set-screw. This set-screw works in a threaded boss or enlargement $j$ formed with the rim and projecting between the parallel web portions $c$ $c$ of section $a$, thus utilizing the space between said web portions, in the remaining space of which the lugs $d$ are located.

Having thus explained the nature and manner of using my invention and described a way in which the same may be constructed, I declare that what I claim is—

The herein-described pulley, composed of two sections or halves having each a central hub portion and parallel connecting web portions, the lugs or flanges $d$, projecting from one of said sections or halves and fitting between the web portions of the other section or half, the securing bolts or pins, the internally-threaded boss or enlargement projecting from one of the sections or halves between the parallel web portions thereof, and the set-screw working therein and provided in its outer end with a polygonal socket, substantially as set forth.

In testimony whereof I have signed my name to this specification, in the presence of two subscribing witnesses, this 6th day of July, A. D. 1889.

THOMAS DAVEY.

Witnesses:
 CALEB LAMSON,
 FRED H. EASTMAN.